United States Patent Office 3,127,405
Patented Mar. 31, 1964

3,127,405
**1-PHENYLALKYL-1,2,3,4,5,6,7,8-OCTAHYDRO-
ISOQUINOLINES**
Otto Schnider and Max Walter, Basel, Switzerland,
assignors to Hoffmann-La Roche Inc., Nutley, N.J., a
corporation of New Jersey
No Drawing. Filed Mar. 14, 1961, Ser. No. 95,505
Claims priority, application Switzerland Mar. 18, 1960
7 Claims. (Cl. 260—283)

This invention relates to novel chemical compounds and to novel methods of preparing the same. More particularly, it relates to novel octahydroisoquinoline derivatives and to processes for their preparation.

Novel endproducts of the invention are bases represented collectively by the formula (I)
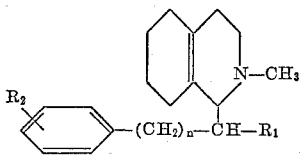

and acid addition salts of said bases with pharmaceutically acceptable acids.

In Formula I, the symbol $R_1$ represents hydrogen or a lower alkyl radical (preferred lower alkyl radicals being those having from 1 to 4 carbon atoms, e.g. methyl, ethyl, propyl, isopropyl, butyl, secondary butyl, and the like). The symbol $R_2$ represents halogen (i.e. fluorine, chlorine, bromine and iodine—chlorine and bromine being preferred, for reasons of economy) or halogen-alkyl (e.g. chloromethyl, trifluoromethyl, 1-chloroethyl, 2-bromoethyl) or nitro. The symbol $n$ represents an integer from 1 to 3, inclusive. Exemplary of pharmaceutically acceptable acids which can be employed to form acid addition salts with the bases of Formula I are inorganic acids, e.g. hydrohalic acids such as hydrochloric acid and hydrobromic acid, sulfuric acid, phosphoric acid, nitric acid, and the like; and organic acids, such as acetic acid, tartaric acid, malic acid, citric acid, fumaric acid, ethanesulfonic acid, and the like.

The endproducts of the invention, i.e. bases of Formula I and their acid addition salts with pharmaceutically acceptable acids, exhibit desirable pharmacological properties, e.g. well defined analgesic and spasmolytic activity, and said endproducts are useful as pharmaceuticals, more especially as analgesic and spasmolytic agents.

In an embodiment related to that discussed above, the invention also provides novel compounds of the formula (II)
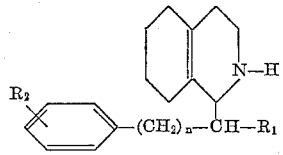

wherein the symbols $n$, $R_1$, $R_2$ have the same meaning defined above in connection with Formula I.

In one of its process aspects, the invention provides novel methods of making bases of Formula I which comprise subjecting a base of Formula II to methylation. A preferred method of methylation is reductive methylation, e.g. by a process which comprises condensing a base of Formula II with formaldehyde (or a material which furnishes formaldehyde under the conditions of reaction) and reducing the condensation product, e.g. catalytically in the presence of Raney-nickel catalyst. However, other equivalent methods of methylation can be employed, as will be apparent to those skilled in the art. The condensation step is preferably effected by condensing the free base with aqueous formaldehyde solution. The condensation product can be reduced chemically, e.g. with formic acid, or catalytically, e.g. with elemental hydrogen in the presence of Raney-nickel catalyst. If the base which is to be methylated contains a nitro group, a chemical method of reduction should be employed such as will avoid reducing the nitro group. Whereas reductive methylation procedures have been described in detail above, it will be apparent to those skilled in the art that equivalent methylation procedures can be employed.

In another of its process aspects, the invention provides alternative methods of making the nitro bases of Formula I which comprise subjecting a base of the formula (III)
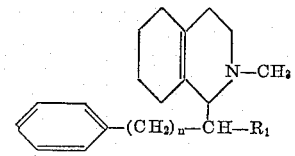

wherein the symbols $n$ and $R_1$ have the same meaning defined above in connection with Formula I, to nitration. A preferred method is direct nitration of the base starting material, especially by reacting a base of Formula III with a nitrating acid mixture. A preferred nitrating acid mixture is 100% nitric acid in glacial acetic acid, employed at temperatures of from about 0° C. to about 20° C. Whereas the foregoing describes a preferred direct nitration procedure, it will be obvious to those skilled in the art that equivalent nitration procedures can be employed.

In still another aspect, the invention teaches conversion of bases of Formula I to their acid addition salts with pharmaceutically acceptable acids, by direct reaction of said bases with said acids, according to methods well known per se.

The bases of Formula II can be made by novel processes which (briefly described) comprise reacting β-(1-cyclohexen-1-yl)-ethyl amine, hereinafter referred to as cyclohexenylethyl amine, with an acid of the formula (IV)
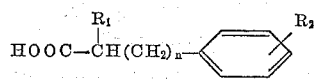

wherein the symbols $n$, $R_1$ and $R_2$ have the same meaning defined above in connection with Formula I, cyclizing the resulting amide, thereby producing the corresponding 1-(ω-phenyl-lower alkyl)-3,4,5,6,7,8-hexahydroisoquinoline, and reducing the latter to the corresponding 1-(ω-phenyl-lower alkyl)-1,2,3,4,5,6,7,8-octahydroisoquinoline.

The condensation (amidation) of the cyclohexenylethyl amine with the acid of Formula IV is advantageously effected by heating the two reactants together in a water-immiscible solvent, e.g. benzene, toluene, xylene, while continuously distilling off the water formed by the condensation reaction. If desired, a condensing agent can also be employed. A preferred method of procedure comprises reacting the starting materials, the amine and the acid, in boiling xylene in the presence of an acidic cation exchanger, which is employed in the acid cycle. Suitable cation exchangers include, for example, strongly acidic polystyrene nuclear sulfonic acid type cation exchangers, such as "Amberlite" IR 120, a brand supplied by Rohm & Haas Co., Philadelphia, Pennsylvania. The acid amide produced by the condensation can in general be separated by filtering the reaction mixture while hot and cooling the filtrate.

The cyclization of the amide to the corresponding hexahydroisoquinoline can be accomplished by treating the amide with acidic dehydrating agents, if desired in the presence of a solvent. Suitable cyclizing agents include, for example, phosphorus oxychloride or mineral acids in a water-immiscible organic solvent, e.g. benzene, toluene, chloroform. A preferred mode of execution comprises refluxing the acid amide in benzene with phosphorus oxychloride for several hours, evaporating the solvent, boiling the residue with water and extracting the acidified solution with chloroform. The chloroform solution is taken to dryness. The residue represents the crude cyclization products.

In the next step, the 3,4,5,6,7,8-hexahydroisoquinoline derivative obtained by the cyclization step is reduced to the corresponding 1,2,3,4,5,6,7,8-octahydroisoquinoline compound. The reduction can be effected either catalytically or by the use of chemical reducing agents, e.g. lithium borohydride or potassium borohydride. When the reduction is effected chemically, by means of an alkali metal metal hydride, as for example in the case where the substituent $R_2$ in the phenyl radical is a nitro group, it is desirable to use a solvent which is inert to the reducing agent employed, e.g. ether, dioxane and the like. If the reduction is effected catalytically in the presence of a metal catalyst, palladium or nickel catalyst can be employed, e.g. Raney-nickel. The hydrogenation is preferably effected in a suitable inert organic solvent, e.g. in a lower alkanol such as methanol or ethanol. For purposes of the ensuing reduction step, the somewhat unstable hexahydroisoquinoline compound need not be prepared in a very high degree of purity. Thus, the crude cyclization product obtained as described above can be employed directly for the catalytic hydrogenation step. The hydrogenation takes place even at room temperature.

Octahydroisoquinoline derivatives of Formulae I, II and III, wherein the symbol $R_1$ designates hydrogen, possess an asymmetric carbon atom. When the symbol $R_1$ signifies a lower alkyl radical, two asymmetric carbon atoms are present. The starting compounds of Formula II and III may be used in optically active form as well as in racemic form. End products obtained as racemates can, if desired, be separated into their optical antipodes by methods known per se. Thus, the separation can be accomplished by the use of optically active acids, e.g. D-tartaric acid, dibenzoyl-D-tartaric acid or D-camphorsulfonic acid.

The invention is further disclosed in the following examples, which are illustrative but not limitative thereof. Temperatures are in degrees centigrade.

*Example 1*

50 g. of β-phenylpropionic acid is refluxed with 45 g. of cyclohexenylethyl amine in 100 ml. of xylene in a round-bottom flask provided with a reflux condenser and water trap until about 6 ml. of water has been collected. Upon cooling the reaction mixture, the amide which has been formed precipitates almost quantitatively. Upon recrystallization from high-boiling petroleum, it has M.P. 69–71°.

75 g. of thus obtained β-phenylpropionic acid-cyclohexenylethyl amide is refluxed for 2 hours in 500 ml. of dry benzene with 50 ml. of phosphorus oxychloride. Then the solvent is distilled off in vacuo and the residue is boiled for 15 minutes with 200 ml. of water, thereby effecting solution of the resinous mass. The reaction mixture is cooled, hydrochloric acid is added until there is a strong Congo red reaction, and the acidic solution is extracted four times, each time with 100 ml. of chloroform. The extracts are combined and concentrated and, in order to remove residual chloroform as thoroughly as possible, the residue is dissolved twice, each time in about 30 ml. of methanol, the solution being concentrated each time. The residue thus obtained comprises crude 1-phenethyl-3,4,5,6,7,8-hexahydroisoquinoline in form of the free base and its hydrochloride.

In order to effect reduction, the above crude residue is dissolved in methanol and hydrogenated at room temperature and normal pressure in the presence of 20 g. of Raney-nickel. A quantity of hydrogen corresponding to the theoretical is slowly taken up.

The catalyst is then filtered off and the solvent is distilled off. The residue obtained is treated with dilute ammonia solution and the free base is extracted by shaking three times, each time with 200 ml. of ether. Upon evaporating the solvent from the extract, there is obtained 70 g. of crude 1-phenethyl-1,2,3,4,5,6,7,8-octahydroisoquinoline. The latter, when reacted in methanolic solution with with mol equivalent of oxalic acid yields the oxalate, which after recrystallization from methanol melts at 191–192°.

25 g. of the above mentioned octahydroisoquinoline, in the form of the free base (obtained from 35 g. of the oxalate by decomposition with ammonia, taking up the base in ether and concentrating the ethereal solution), is dissolved in 200 ml. of methanol and mixed with 12 ml. of a 40% aqueous solution of formaldehyde. The reaction mixture is allowed to stand for 15 hours at room temperature. Then 10 g. of Raney-nickel is added and the mixture is hydrogenated at room temperature. The hydrogen is taken up very quickly. The catalyst is filtered off and the solvent is distilled, the residue obtained is dissolved in 50 ml. of ethyl acetate and reacted with one mol equivalent of oxalic acid in ethyl acetate. 26 g. of 1-phenethyl-2-methyl-1,2,3,4,5,6,7,8-octahydroisoquinoline oxalate crystallizes out, M.P. 144–145°. The hydrochloride of the same base, obtained in analogous manner, melts at 137–140°.

14.5 g. of the above-mentioned N-methyl-octahydroisoquinoline, in the form of the free base (obtained from the oxalate) is dissolved in 30 ml. of glacial acetic acid and is reacted while stirring at 0–5°, within a period of two hours, with a solution of 85 ml. of 100% nitric acid in 60 ml. of glacial acetic acid. The mixture is stirred for an additional period of 5 hours and then is allowed to stand for 15 hours at 0°. The solution is made ammoniacal while cooling with ice, and the nitro compound which separates is extracted with ether. The ethereal solution is concentrated and the residue is dissolved in 50 ml. of acetone and reacted with one mol equivalent of oxalic acid dissolved in acetone. Thereupon, 1-(4-nitrophenethyl)-2-methyl-1,2,3,4,5,6,7,8-octahydroisoquinoline oxalate crystallizes out in needles. It is recrystallized from acetone and again from water. M.P. 151–152°. Hydrochloride: M.P. 197°.

*Example 2*

In analogous manner to Example 1, 80 g. of β-(4-fluorophenyl)-propionic acid (M.P. 95°; obtainable from 4-fluorobenzaldehyde and malonic acid by condensation, decarboxylation and hydrogenation) is condensed with 60 g. of cyclohexenylethyl amine in 400 ml. of xylene. Thus is obtained 80 g. of the amide, of M.P. 94–95°. Upon cyclization and hydrogenation, there is obtained 1-(4-fluorophenethyl) - 1,2,3,4,5,6,7,8 - octahydroisoquinoline. The hydrochloride melts at 237–238°. Methylation of the base yields 1-(4-fluorophenethyl)-2-methyl-1,2,3,4,5,6,7,8-octahydroisoquinoline, the hydrochloride of which forms colorless leaflets upon crystallization from acetone, which melt at 189°.

By employing as starting material β-(4-chlorophenyl)-propionic acid and cyclohexenylethyl amine, there is obtained by amidation, cyclization, hydrogenation, and N-methylation, 1-(4-chlorophenethyl)-2-methyl - 1,2,3,4,5,-6,7,8-ocetahydroisoquinoline, the oxalate of which upon crystallization from water forms yellowish needles of M.P. 128–130°.

*Example 3*

20 g. of δ-phenyl-valeric acid is dissolved in 200 ml. of 65% nitric acid, mixed with 20 ml. of 100% nitric acid, and kept for four hours at 85° while stirring. Then the nitration mixture is poured onto ice and the nitrophenyl-valeric acid which separates is sucked off and purified by distillation in vacuo. B.P. 175–180°/0.1 mm. M.P. 235–237°.

10 g. of δ-(4-nitrophenyl)-valeric acid, 10 g. of cyclohexenylethyl amine and 2 g. of "Amberlite" IR 120 cation exchanger (in acid form) are refluxed in 150 ml. of xylene in a round-bottom flask provided with a reflux condenser and water trap. The condensation is complete after four hours. The reaction mixture is filtered hot from the ion exchanger and diluted with an equal volume of benzene. The thus diluted filtrate is washed with hydrochloric acid, dilute soda solution and water, the organic solvent is distilled off, and the residue is subjected to fractional distillation. 7 g. of δ-(4-nitrophenyl)-valeric acid-cyclohexenylethyl amide is obtained as a colorless oil, B.P. 230–240°/0.1 mm.

7 g. of the last mentioned acid amide is cyclized in the manner described in Example 1. The chloroform extract obtained after cyclization is taken up in 100 ml. of methanol, mixed with 3 g. of potassium borohydride and allowed to stand for 15 hours at room temperature. An additional quantity of 2 g. of potassium borohydride is added and the mixture is allowed to stand for 30 minutes at a temperature of 30°. The reaction mixture is worked up and the reduction product is converted to its oxalate which is recrystallized from alcohol/ether, yielding 1-[4-(4-nitrophenyl)-butyl]-1,2,3,4,5,6,7,8 - octahydroisoquinoline-oxalate, M.P. 145°.

7 g. of the last mentioned octahydroisoquinoline, in the form of the free base, obtained from 10 g. of oxalate, is refluxed for 30 minutes, at an oil bath temperature of 120°, with 18 ml. of 38% aqueous formaldehyde solution and 18 ml. of formic acid. Upon completion of the reaction, the reaction mixture is made ammoniacal and the base is extracted by repeatedly shaking with ether. There is thus obtained 1-[4-(4-nitrophenyl)-butyl]-2-methyl-1,2,3,4,5,6,7,8-octahydroisoquinoline as an almost colorless oil of B.P. 160–170°/0.1 mm.

*Example 4*

By condensing p-nitrobenzyl-methyl-acetic acid (M.P. 120°; obtained by nitrating benzyl-methyl-acetic acid according to the indications in Example 3) with cyclohexenylethyl amine in analogous manner to Example 3, the amide is obtained in good yield. Upon recyclization from high boiling petroleum ether, the amide melts at 108°. Upon cyclization and reduction of the cyclization product with potassium borohydride, there is obtained 1-[1-methyl-2-(4-nitrophenyl)-ethyl]-octahydroisoquinoline oxalate of M.P. 185–186°. The N-methylation is accomplished as taught in Example 3. The base obtained is dissolved in acetone and reacted with 63% hydrobromic acid. Thereupon, 1-[1-methyl-2-(4-nitrophenyl)-ethyl]-2-methyl-1,2,3,4,5,6,7,8-octahydroisoquinoline hydrobromide precipitates in the form of colorless prisms. Upon recrystallization from acetone, the material has M.P. of 210–212°.

*Example 5*

In similar manner to Example 1, γ-phenyl-butyric acid is condensed with cyclohexenylethyl amine. The amide boils at 175–185°/0.1 mm., and after recrystallization from isopropyl ether melts at 55–57°. Upon cyclization and hydrogenation as taught in Example 1, there is obtained 1-(3-phenyl-propyl)-1,2,3,4,5,6,7,8-octahydroisoquinoline. The oxalate of the latter, recrystallized from acetone, melts at 150°. The hydrochloride of the same base crystallizes from alcohol in colorless prisms which melt at 138°. Upon N-methylation in analogous manner to Example 1, and conversion of the N-methyl base to the hydrochloride and recrystallization of the latter from ethyl acetate, the hydrochloride melts at 171°. Upon nitration in analogous manner to Example 1, the 1-[3-(4-nitrophenyl) - propyl] - 2 - methyl - 1,2,3,4,5,6,7,8 - octahydroisoquinoline hydrobromide obtained forms yellowish needles of M.P. 205°.

*Example 6*

18 g. of β-(3-trifluoromethyl-phenyl)-propionic acid (obtained from 3-trifluoromethyl-benzylaldehyde and malonic acid, followed by condensation, decarboxylation and hydrogenation of the condensation product; melting point of the intermediate 3-trifluoromethyl-cinnamic acid 130–131°), 10 g. of cyclohexenylethyl amine and 2 g. of "Amberlite" IR 120 (in acid form) are refluxed in 120 ml. xylene for about 5 hours according to the indications in Example 3. The catalyst is filtered off and the solution concentrated. Petroleum ether of boiling point 50° is added. The mixture is allowed to stand for several hours at 0°, whereupon β-(3-trifluoromethyl-phenyl)-propionic acid-cyclohexenylethyl amide precipitates (19 g.; melting point 83–84°). The amide is cyclized without further purification as taught in Example 1. The thus obtained crude 1 - (3 - trifluoromethyl - phenethyl) - 3,4,5,6,7,8-hexahydroisoquinoline compound is dissolved in 10 parts by volume of methanol and hydrogenated in the presence of colloidal palladium catalyst (0.5%). After the uptake of the calculated quantity of hydrogen the solution is adjusted to a Congo-red reaction by adding hydrochloric acid. Then the catalyst is filtered off. Upon concentrating the filtrate, there are obtained 19 g. of the hydrochloride of the octahydro compound; melting point 161–162°. Upon N-methylation as taught in Example 3, there is obtained 1-(3-trifluoromethyl-phenethyl)-2-methyl-1,2,3,4,5,6,7,8-octahydroisoquinoline (16 g.; melting point of the oxalate 124–125°).

*Example 7*

21 g. of 1-(4-nitro-phenethyl)-2-methyl-1,2,3,4,5,6,7,8-octahydroisoquinoline (obtained from the oxalate by treatment with ammonia) are dissolved in 100 ml. of acetone and mixed with a concentrated solution of 27 g. of dibenzoyl-D-tartaric acid in acetone.

After seeding, the mixture is allowed to stand for several hours at 0°. The dibenzoyl-tartrate salt which separates is recrystallized from methanol/ether; melting point 139°, $[\alpha]_D^{20} = -70°$ (c.=1 in methanol). The free base, (+)-1 - (4 - nitro - phenethyl) - 2 - methyl - 1,2,3,4,5,6,7,8-octahydroisoquinoline, is obtained from the dibenzoyl-tartrate salt by treatment of the latter with ammonia; $[\alpha]_D^{20} = +12°$ (c.=2.5 in methanol). Melting point of the hydrochloride 220°; $[\alpha]_D^{20} = -27°$ (c. =1.4 in methanol). Melting point of the hydrobromide 218°; $[\alpha]_D^{20} = -25°$ (c.=3 in methanol).

The mother-liquors of the above-mentioned dibenzoyl tartrate salt are concentrated and the residue is treated with ammonia to yield (−)-1-(4-nitro-phenethyl)-2-methyl - 1,2,3,4,5,6,7,8 - octahydroisoquinoline; $[\alpha]_D^{20} = -11.8°$ (c.=3 in methanol). Melting point of the hydrochloride 220–221°; $[\alpha]_D^{20} = +28°$ (c.=1.4 in methanol). Melting point of the hydrobromide 218°; $[\alpha]_D^{20} = +25°$ (c.=1.4 in methanol).

We claim:

1. A compound selected from the group consisting of bases of the formula

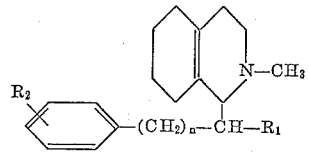

wherein $n$ is an integer from 1 to 3, inclusive, $R_1$ is chosen from the group consisting of hydrogen and lower alkyl, and $R_2$ is chosen from the group consisting of halogen, halogen-lower alkyl and nitro; and acid addition salts of said bases with pharmaceutically acceptable acids.

2. A compound selected from the group consisting of bases of the formula

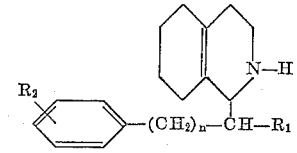

wherein $n$ is an integer from 1 to 3, inclusive, $R_1$ is chosen from the group consisting of hydrogen and lower alkyl, and $R_2$ is chosen from the group consisting of halogen, halogen-lower alkyl and nitro; and acid addition salts of said bases with pharmaceutically acceptable acids.

3. 1 - (4 - nitrophenethyl) - 2 - methyl - 1,2,3,4,5,6,7,8-octahydroisoquinoline.

4. 1 - [3 - (4 - nitrophenyl)propyl] - 2 - methyl - 1,2,3,4,5,6,7,8-octahydroisoquinoline.

5. 1 - (4 - nitrophenethyl) - 1,2,3,4,5,6,7,8-octahydroisoquinoline.

6. 1 - [3 - (4 - nitrophenyl)propyl] - 1,2,3,4,5,6,7,8-octahydroisoquinoline.

7. 1 - [1 - methyl - 2 - (4 - nitrophenyl)-ethyl] - 2-methyl - 1,2,3,4,5,6,7,8 - octahydroisoquinoline hydrobromide.

References Cited in the file of this patent

UNITED STATES PATENTS

| 2,651,635 | Henecka | Sept. 8, 1953 |
| 2,683,146 | Robinson | July 6, 1954 |

FOREIGN PATENTS

| 802,571 | Germany | Feb. 15, 1951 |

OTHER REFERENCES

Derwent: Commonwealth Patent Reports, vol. 183, Apr. 14, 1960 (South Africa).

Yale—J. of Medicinal and Pharmaceutical Chemistry, vol. 1, No. 2, pp. 121–131 (1959).

Chemical Abstracts, vol. 49, pp. 8159 (1955), citing Zhur Obshchei, vol. 24, 922–4 (1954).